(12) United States Patent
Li et al.

(10) Patent No.: US 9,398,507 B2
(45) Date of Patent: Jul. 19, 2016

(54) METHOD AND USER EQUIPMENT FOR PROCESSING FREQUENCY INFORMATION

(71) Applicant: HUAWEI TECHNOLOGIES CO., LTD., Shenzhen (CN)

(72) Inventors: Bingzhao Li, Beijing (CN); Yongqiang Gao, Beijing (CN); Yanyan Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 221 days.

(21) Appl. No.: 13/937,518

(22) Filed: Jul. 9, 2013

(65) Prior Publication Data

US 2013/0294416 A1  Nov. 7, 2013

Related U.S. Application Data

(63) Continuation of application No. PCT/CN2012/070143, filed on Jan. 9, 2012.

(30) Foreign Application Priority Data

Jan. 10, 2011  (CN) .......................... 2011 1 0004298

(51) Int. Cl.
*H04L 1/00* (2006.01)
*H04W 36/30* (2009.01)
*H04W 36/00* (2009.01)

(52) U.S. Cl.
CPC .......... *H04W 36/30* (2013.01); *H04W 36/0083* (2013.01); *H04W 36/0061* (2013.01)

(58) Field of Classification Search
CPC ..... H04W 80/04; H04W 80/05; H04W 80/06; H04W 80/07; H04W 80/08; H04W 36/30; H04W 36/31

USPC ................... 370/329–332; 455/436
See application file for complete search history.

(56) References Cited

U.S. PATENT DOCUMENTS

| 6,597,679 | B1 | 7/2003 | Willars |
| 6,845,238 | B1 * | 1/2005 | Muller .......................... 455/436 |

(Continued)

FOREIGN PATENT DOCUMENTS

| CN | 1433650 A | 7/2003 |
| CN | 1154277 C | 6/2004 |

(Continued)

OTHER PUBLICATIONS

Extended European Search Report dated May 12, 2014 in corresponding European Patent Application No. 12734560.1.

(Continued)

*Primary Examiner* — Dady Chery
(74) *Attorney, Agent, or Firm* — Staas & Halsey, LLP (57) ABSTRACT

The present invention discloses a method and a user equipment for processing frequency information. The method for processing frequency information includes: receiving a measurement control message sent from network device, where the measurement control message contains frequency information for inter-frequency measurement without compressed mode; and clearing stored frequency information for inter-frequency measurement without compressed mode if the type of frequency information for inter-frequency measurement without compressed mode that is contained in the measurement control message is different from the type of the stored frequency information for inter-frequency measurement without compressed mode. The technical solutions disclosed in the present invention avoid a problem of measurement failure when a UE performs measurement without compressed mode on an adjacent frequency.

4 Claims, 8 Drawing Sheets

(56) References Cited

U.S. PATENT DOCUMENTS

| | | | |
|---|---|---|---|
| 2003/0072279 A1 | 4/2003 | Hamalainen et al. | |
| 2006/0183482 A1* | 8/2006 | Ueda | 455/439 |
| 2009/0253458 A1 | 10/2009 | Dillinger et al. | |
| 2013/0142164 A1* | 6/2013 | Shi | H04W 24/10 370/329 |

FOREIGN PATENT DOCUMENTS

| | | |
|---|---|---|
| CN | 1735265 | 2/2006 |
| CN | 101043697 | 9/2007 |
| CN | 101141744 | 3/2008 |
| CN | 101305633 | 11/2008 |
| CN | 100505939 C | 6/2009 |
| CN | 101626592 | 1/2010 |
| EP | 1691568 | 8/2006 |
| EP | 2117181 | 11/2009 |
| GB | 2370191 | 6/2002 |
| WO | WO2008/052201 | 5/2008 |
| WO | WO2010/096968 | 9/2010 |

OTHER PUBLICATIONS

"Measurement Handling at Inter-Frequency Handover", NTT DOCOMO, INC., 6.2.1.3, 3GPP TSG RAN WG2 #63bis, Prague, Czech Republic, Sep. 29-Oct. 3, 2008, pp. 1-10.
"Change Request", 25.331 CR 3953, 3GPP TSG-RAN-WG2 Meeting #68, Jeju, Korea, Nov. 9-13, 2009, 30 pp.
"Change Request", 25.331 CR 4514, 3GPP TSG-RAN2 Meeting #73, Taipei, Feb. 21-25, 2011, 5 pp.
"Discussion on the Clearance of the Stored Frequency Information for Measurement Without CM", Huawei, HiSilicon, 8.2, 3GPP TSG-RAN WG2 Meeting #74, Barcelona, Spain, May 9-13, 2011, pp. 1-4.
"Discussion on the Clearance of Adjacent/Inter-Band Frequency Info", Huawei, HiSilicon, 8, 3GPP TSG-RAN WG2 #72bis, Dublin, Ireland, Jan. 17-21, 2011, pp. 1-3.
International Search Report, dated Apr. 12, 2012, in corresponding International Application No. PCT/CN2012/070143 (2 pp.).
Written Opinion of the International Searching Authority, dated Apr. 12, 2012, in corresponding International Application No. PCT/CN2012/070143 (7 pp.).
Search Report, dated Dec. 28, 2012, in corresponding Chinese Application No. 201110004298.X (16 pp.).
First Office Action, dated Feb. 5, 2013, in corresponding Chinese Application No. 201110004298.X (13 pp.).
Second Office Action, dated Jun. 4, 2013, in corresponding Chinese Application No. 201110004298.X (11 pp.).
3$^{rd}$ *Generation Partnership Project; Technical Specification Group Radio Access Network; Radio Resource Control (RRC); Protocol specification (Release 10)*, 3GPP TS 25.331 V10.2.0 (Dec. 2010), pp. 1-1834.
International Search Report mailed Apr. 12, 2012 in corresponding International Application No. PCT/CN2012/070143.
Chinese Office Action issued Dec. 26, 2013 in corresponding Chinese Patent Application No. 201110337671.3.
Chinese Search Report issued Jan. 6, 2014 in corresponding Chinese Patent Application No. 201110337671.3.

* cited by examiner

METHOD AND USER EQUIPMENT FOR PROCESSING FREQUENCY INFORMATION

CROSS-REFERENCE TO RELATED APPLICATIONS

This application is a continuation of International Application No. PCT/CN2012/070143, filed on Jan. 9, 2012, which claims priority to Chinese Patent Application No. 201110004298.X, filed on Jan. 10, 2011, both of which are hereby incorporated by reference in their entireties.

TECHNICAL FIELD

Embodiments of the present invention relate to the field of communications, and in particular, to a method and a user equipment for processing frequency information.

BACKGROUND

A multi-carrier technology is a technology of sending data to a user equipment (User Equipment, hereinafter referred to as UE) through multiple carriers simultaneously. In a multi-carrier system, a compressed mode is introduced for implementing inter-frequency measurement or inter-system measurement in frequency division duplexing (Frequency Division Duplexing, hereinafter referred to as FDD). The inter-frequency measurement refers to network measurement conducted when the working frequency of a UE changes in the same communication system. The inter-system measurement refers to network measurement conducted when the network system where a UE works changes, for example, network measurement performed when the UE is handed over between network systems using different access technologies, for example, from a global system for mobile communications (Global System for Mobile Communications, hereinafter referred to as GSM) to a wideband code division multiple access (Wideband Code Division Multiple Access, hereinafter referred to as WCDMA) system.

The compressed mode indicates that one receiver can only work on one receiving and transmitting frequency at a time. To measure signals on another frequency, the receiver must stop working and switch to a target frequency before performing measurement. To ensure normal transmission of downlink signals, network device needs to transmit original signals within a remaining transmission time. This is a downlink compressed mode. When measurement frequency and uplink transmitting frequency are close, transmission of uplink signals needs to be stopped simultaneously to ensure the measurement effect. This is an uplink compressed mode. Activating a compressed mode for a UE and network device may affect data receiving on the current frequency. Therefore, activation of the compressed mode should be avoided as much as possible.

For a user equipment (User Equipment, hereinafter referred to as UE) that supports multiple carriers over one frequency band (hereinafter referred to as band), only one receiver is required. For example, the bandwidth of the receiver is 10 M, and the bandwidth of each carrier is 5 M. Accordingly, the UE does not need to activate the compressed mode when performing the inter-frequency measurement on adjacent carriers, and the UE needs to activate the compressed mode when performing the inter-frequency measurement on non-adjacent carriers. For a UE that supports multiple inter-band (hereinafter referred to as inter-band) carriers, two receivers are required and the two receivers are working on different bands. The UE may work on some band combinations. Therefore, the UE may simultaneously measure two bands in a band combination without activating the compressed mode. For the band of each receiver, similar to the situation where only one receiver is used, the UE may perform inter-frequency measurement on adjacent carriers without activating a compressed mode.

In the prior art, a UE may report capability information for inter-frequency measurement without compressed mode to network device. The network device configures an inter-frequency neighboring cell list in measurement control and indicates the UE that the UE may perform measurement without compressed mode on the frequencies of cells corresponding to an adjacent frequency index (hereinafter referred to as adjacent frequency index) in the inter-frequency neighboring cell list. When performing measurement on adjacent frequencies, the UE needs to check whether the frequencies to be measured are the frequencies indicated by the adjacent frequency index. If yes, the UE performs measurement without compressed mode on the adjacent frequencies. If not, the UE waits for the compressed mode.

However, in the prior art, when a UE performs measurement without compressed mode on adjacent frequencies, a problem of measurement failure frequently occurs.

SUMMARY

The present invention provides a method and a user equipment for processing frequency information from a plurality of aspects.

In one aspect, the present invention provides a method for processing frequency information, including: performing handover interaction with network device, and clearing stored frequency information for inter-frequency measurement without compressed mode according to a frequency used after the handover.

Accordingly, in another aspect, the present invention provides a user equipment, including an inter-frequency handover processing module, configured to perform handover interaction with network device, and a first clearance processing module, configured to clear stored frequency information for inter-frequency measurement without compressed mode according to a frequency after the handover processing module performs the handover.

In embodiments of the present invention, after performing an inter-frequency handover interaction process with network device, a UE may clear stored frequency information for inter-frequency measurement without compressed mode. Therefore, after the UE performs the frequency handover, if the network device activates a measurement operation on the previously stored frequency information for inter-frequency measurement without compressed mode, the UE performs measurement by using a compressed mode instead of not activating the compressed mode. This avoids a problem of measurement failure of the UE.

In the embodiments of the present invention, during a measurement control process initiated by network device, if a UE determines that the type of newly configured frequency information for inter-frequency measurement without compressed mode on the network device is different from the type of currently stored frequency information for inter-frequency measurement without compressed mode, the UE may clear the currently stored frequency information for inter-frequency measurement without compressed mode. This ensures that in a measurement control process, the UE only stores one type of frequency information for inter-frequency measurement without compressed mode, thereby avoiding a problem that the UE cannot determine on which frequency the measurement without compressed mode should be performed when a plurality of types of frequency information for inter-frequency measurement without compressed mode is stored.

In another aspect, the present invention provides another method for processing frequency information, including: receiving a first measurement control message sent from network device, and clearing stored frequency information for inter-frequency measurement without compressed mode if the first measurement control message does not contain frequency information for inter-frequency measurement without compressed mode.

Accordingly, in another aspect, the present invention provides another user equipment, including: a fourth receiving module, configured to receive a first measurement control message sent from network device; and a third clearance processing module, configured to clear stored frequency information for inter-frequency measurement without compressed mode if the first measurement control message does not contain frequency information for inter-frequency measurement without compressed mode. In the embodiments of the present invention, by sending a measurement control message that does not contain frequency information for inter-frequency measurement without compressed mode to a UE, network device may control the UE to clear stored frequency information for inter-frequency measurement without compressed mode. Therefore, if the network device activates a measurement operation on previously stored frequency information for inter-frequency measurement without compressed mode, the UE performs measurement by using a compressed mode instead of not activating the compressed mode. This avoids a problem of measurement failure of the UE.

BRIEF DESCRIPTION OF DRAWINGS

To illustrate the technical solutions in embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The present invention can be applied in various communication systems, such as a WCDMA system, a Code Division Multiple Access 2000 (Code Division Multiple Access, hereinafter referred to as CDMA) system, and a Long Term Evolution (Long Term Evolution, hereinafter referred to as LTE) system.

Figure 1:
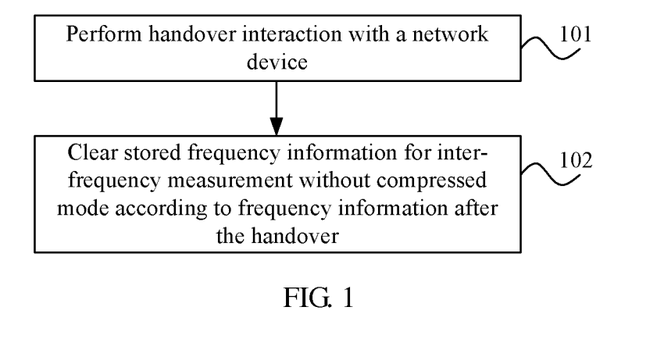
FIG. 1 is a flowchart of a method for processing frequency information according to an embodiment of the present invention.

FIG. 1 is a flowchart of a method for processing frequency information according to an embodiment of the present invention. As shown in FIG. 1, the method of this embodiment may be as follows:

101: Perform handover interaction with network device.

For example, a UE may perform an inter-frequency handover interaction process with the network device. The network device in this embodiment may be a base station controller, such as a radio network controller (Radio Network Controller, hereinafter referred to as RNC), a base station controller (Base Station Controller, hereinafter referred to as BSC), a base station eNodeB, or the like, and is not restricted by this embodiment.

For a multi-carrier system, a handover between carriers is an inter-frequency handover, which is performed for achieving load balance between carrier frequencies. In this embodiment, the handover interaction process performed between the UE and the network device may include an intra-frequency handover and an inter-frequency handover. The handover interaction process may be performed by using the prior art and will not be described in detail herein.

102: Clear stored frequency information for inter-frequency measurement without compressed mode according to a frequency used after the handover.

In this embodiment, after the network device performs the inter-frequency handover interaction with the UE network device, the UE may clear the stored frequency information for inter-frequency measurement without compressed mode according to the frequency used after the handover.

For example, the UE initially works on frequency F1, and the stored frequency information for inter-frequency measurement without compressed mode in the UE is frequency F2. After the network device performs the inter-frequency handover interaction process with the UE, the UE is handed over to frequency F5. Frequency F5 does not have any adjacent frequency. Therefore, the network device does not update adjacent frequency information of the UE.

In the prior art, stored frequency information for inter-frequency measurement without compressed mode in the UE is a global variable, which may be cleared only when the UE leaves a cell dedicated channel (Cell Dedicated Channel, hereinafter referred to as Cell DCH). Therefore, even after the UE is handed over to frequency F5, the stored frequency information for inter-frequency measurement without compressed mode in the UE is still frequency F2. If the network device activates measurement on frequency F2, the UE may determine that the activation of a compressed mode is not needed when the measurement on frequency F2 is performed, according to the stored frequency F2 related frequency information about inter-frequency measurement without compressed mode. However, frequency F2 and frequency F5 are beyond the bandwidth of a 10 M receiver of the UE. As a result, the UE may have a problem of measurement failure.

In comparison, in this embodiment, the UE may automatically clear the stored frequency information for inter-frequency measurement without compressed mode. For example, after the UE is handed over to frequency F5, the UE may clear the stored frequency F2 about inter-frequency measurement without compressed mode, according to frequency F5 after the handover. Therefore, when the network device activates measurement on frequency F2, the UE may determine that the activation of the compressed mode is needed when the measurement on frequency F2 is performed because the UE does not store frequency F2 related frequency information for inter-frequency measurement without compressed mode. This avoids the problem of measurement failure when the UE performs measurement without compressed mode on frequency F2.

It should be noted that, this embodiment only uses the situation where the stored frequency information for inter-frequency measurement without compressed mode is adjacent frequency information in the UE as an example for illustration. It may be understood by persons skilled in the art that, for the situation where the stored frequency information for inter-frequency measurement without compressed mode in the UE is inter-band (hereinafter referred to as inter-band) frequency information, the technical solution of this embodiment may also be used, with a similar implementation principle, except that it is required to further determine whether the frequency after the handover resides in the same band as the frequency before the handover, and if the frequency does not reside in the same band, clear the inter-band frequency information.

It should be noted that, the forgoing embodiment only uses a WCDMA system as an example for illustration, while in an LTE system, inter-frequency handover without compressed mode is called inter-frequency handover without gap mode, with a similar implementation principle.

In this embodiment, after performing a handover interaction process with network device, a UE may clear stored frequency information for inter-frequency measurement without compressed mode. Therefore, after the UE performs a frequency handover, if the network device activates a measurement operation on previously stored frequency information for inter-frequency measurement without compressed mode, the UE performs measurement by using a compressed mode instead of not activating the compressed mode. This avoids a problem of measurement failure of the UE.

In the following description, two specific embodiments are used to detail the technical solution of the embodiment shown in FIG. 1. It should be noted that, these two specific embodiments use an RNC as an example of network device for illustration. It may be understood by persons skilled in the art that other devices may be also used as the network device, such as a BSC.

Figure 2:
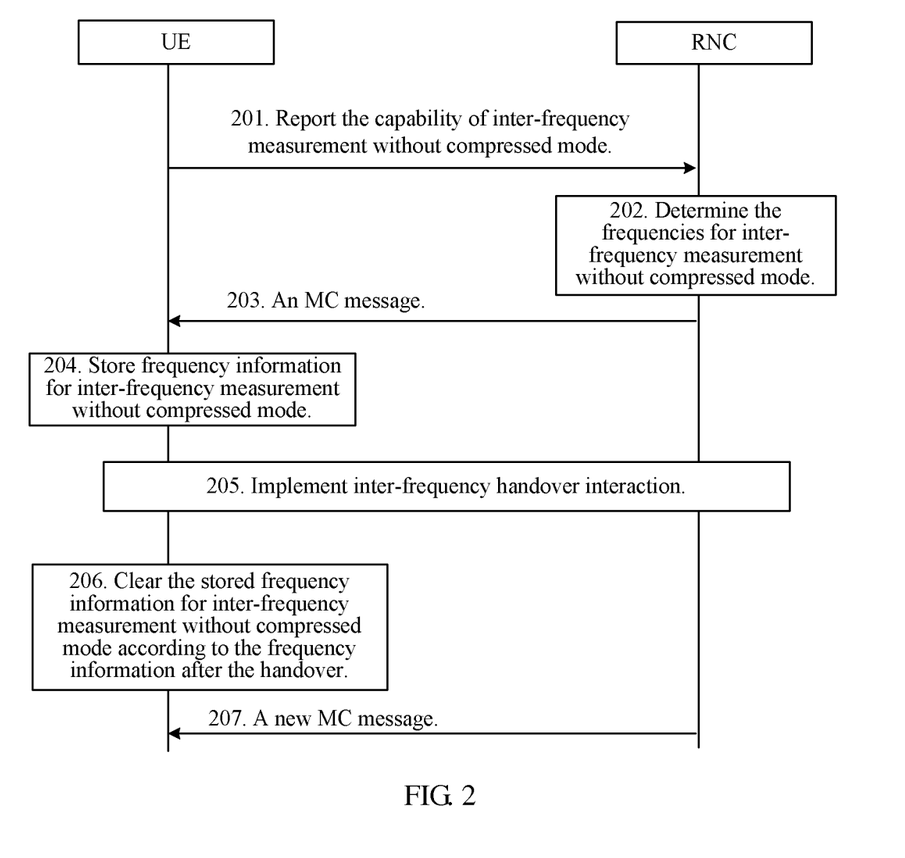
FIG. 2 is a signaling flowchart of a method for processing frequency information according to another embodiment of the present invention.

FIG. 2 is a signaling flowchart of a method for processing frequency information according to another embodiment of the present invention. As shown in FIG. 2, the method of this embodiment may be as follows:

201: A UE reports capability of inter-frequency measurement without compressed mode to an RNC.

For example, the capability of inter-frequency measurement without compressed mode that is reported by the UE to the RNC may be at least one type of information of adjacent frequency information and inter-band frequency information. If the adjacent frequency information is reported, it indicates that the UE may perform measurement without compressed mode on a frequency that is adjacent to a currently used frequency. If the inter-band frequency information is reported, it indicates that the UE may perform measurement without compressed mode on an inter-band frequency. If both types of information are reported, it indicates that the UE simultaneously supports both types of capability. In a specific implementation process, the UE may determine, according to the receiver capability and number of receivers of the UE, whether to report one of the preceding two types of information or both.

In a specific implementation process, the UE may have the capability of inter-frequency measurement without compressed mode contained in a radio resource control connection setup complete (Radio Resource Control Connection Setup complete, hereinafter referred to as RRC Connection Setup complete) message and send the RRC Connect Setup complete message to the RNC.

202: The RNC determines frequencies for inter-frequency measurement without compressed mode.

The RNC may determine, according to the capability of inter-frequency measurement without compressed mode that is reported by the UE, the frequencies for inter-frequency measurement without compressed mode to be configured on the UE.

For example, if the capability of inter-frequency measurement without compressed mode that is reported by the UE to the RNC is the adjacent frequency information, the RNC may determine that the frequency for inter-frequency measurement without compressed mode is the left-adjacent frequency or right-adjacent frequency of a frequency currently used by the UE. For example, the frequency currently used by the UE is F2, the left-adjacent frequency of F2 is F1, and the right-adjacent frequency of F2 is F3. Therefore, the RNC may determine that the frequency for inter-frequency measurement without compressed mode is F1 or F3.

If the capability of inter-frequency measurement without compressed mode that is reported by the UE to the RNC is the inter-band frequency information, the RNC may determine that the frequency for inter-frequency measurement without compressed mode is frequency in another band different from a band where the frequency currently used by the UE resides, and a combination of the band where the frequency currently used by the UE resides and a band where the inter-band frequency resides is a band combination supported by the UE. For example, the frequency currently used by the UE is F2, a band where the frequency F2 resides is band 1, and a band combination supported by the UE is band1+band 3. The RNC may determine that the frequency for inter-frequency measurement without compressed mode is any one of frequencies in band3.

If the capability of inter-frequency measurement without compressed mode that is reported by the UE to the RNC is the adjacent frequency information and inter-band frequency information, the RNC may use the foregoing two manners to determine the frequency for inter-frequency measurement without compressed mode.

203: The RNC delivers a measurement control message to the UE, where the measurement control message contains adjacent frequency information and/or inter-band frequency information.

The RNC may send the measurement control (Measurement Control, hereinafter referred to as MC) message to the UE. The MC message may contain the adjacent frequency information or inter-band frequency information, or the MC message contains the adjacent frequency information and inter-band frequency information. The adjacent frequency information and inter-band frequency information have been described in detail in the foregoing step 202 and will not be described again herein.

In a specific implementation process, the adjacent frequency information and/or inter-band frequency information may be contained the MC message by using an inter-frequency neighboring cell list or an index, or the adjacent frequency information and/or inter-band frequency information may be also directly contained.

204: The UE stores frequency information for inter-frequency measurement without compressed mode.

205: The UE performs an inter-frequency handover interaction process with the RNC.

The implementation principle of this step is similar to that of step 101 shown in FIG. 1 and will not be described again herein. After implementing this step, the UE is handed over from a frequency used before the handover to a frequency used after the handover.

206: The UE clears stored frequency information for inter-frequency measurement without compressed mode according to frequency after the handover.

The UE may store any of the three types of frequency information for inter-frequency measurement without compressed mode, including adjacent frequency information, inter-band frequency information, and both the adjacent frequency information and inter-band frequency information. Therefore, the UE may perform the following operations after an inter-frequency handover:

(1) When the frequency information for inter-frequency measurement without compressed mode that is stored by the UE is adjacent frequency information:

For this case, after performing the inter-frequency handover, the UE may clear stored adjacent frequency information because the frequency used after the handover is different from the frequency used before the handover.

(2) When the frequency information for inter-frequency measurement without compressed mode that is stored by the UE is inter-band frequency information:

For this case, after performing the inter-frequency handover, the UE determines whether the frequency after the handover resides in the same band as the frequency before the handover. If the frequency information resides in the same band, the UE does not need to clear the inter-band frequency information because the UE may still perform correct measurement on the frequency used after the handover by using the inter-frequency measurement without compressed mode. If the frequency used after the handover does not reside in the same band as the frequency used before the handover, the UE needs to clear the inter-band frequency information because a band where the frequency after the handover resides may not belong to a band combination supported by the UE.

(3) When the frequency information for inter-frequency measurement without compressed mode that is stored by the UE is both the adjacent frequency information and inter-band frequency information:

For this case, after performing an inter-frequency handover, if the UE determines that the frequency used after the handover resides in the same band as the frequency used before the handover, the UE only needs to clear the adjacent frequency information. If the frequency used after the handover does not reside in the same band as the frequency used before the handover, the UE needs to clear both the adjacent frequency information and inter-band frequency information.

207: The RNC delivers a new measurement control message to the UE, where the new measurement control message contains new frequency information for inter-frequency measurement without compressed mode.

After the UE clears the stored frequency information for inter-frequency measurement without compressed mode, the RNC may configure new frequency information for inter-frequency measurement without compressed mode in a new MC process. The foregoing steps 204 and 205 may be repeated again in the later process.

In this embodiment, after performing an inter-frequency handover interaction process with network device, a UE may use different methods to clear frequency information for inter-frequency measurement without compressed mode according to stored frequency information for inter-frequency measurement without compressed mode in the UE. Therefore, after the UE performs the frequency handover, if the network device activates a measurement operation on previously stored frequency information for inter-frequency measurement without compressed mode, the UE performs measurement by using a compressed mode instead of not activating the compressed mode. This avoids a problem of measurement failure of the UE.

Figure 3:
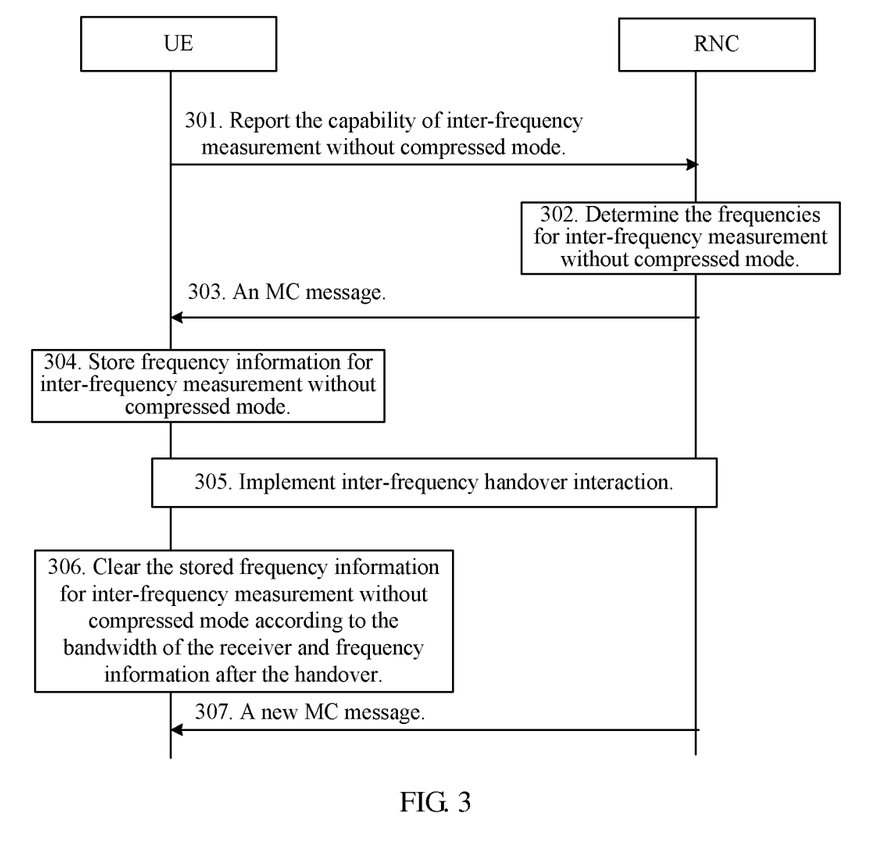
FIG. 3 is a signaling flowchart of a method for processing frequency information according to another embodiment of the present invention.

FIG. 3 is a signaling flowchart of a method for processing frequency information according to another embodiment of the present invention. As shown in FIG. 3, the method of this embodiment may be as follows:

301: A UE reports capability of inter-frequency measurement without compressed mode to an RNC.

In this embodiment, the UE may have the capability of inter-frequency measurement without compressed mode contained in an RRC Connect Setup complete message and then send the RRC Connect Setup complete message to the RNC. The specific implementation process of step 301 is similar to the implementation process of step 201 shown in FIG. 2 and will not be described again herein.

302: The RNC determines frequencies for inter-frequency measurement without compressed mode.

The difference between step 302 and step 202 shown in FIG. 2 lies in that, in this embodiment, the frequency information for inter-frequency measurement without compressed mode that is determined by the RNC may further contain in-band frequency information of a receiver. The in-band frequency information of the receiver is about a frequency whose combination with a current main carrier and secondary carrier of the UE is within a bandwidth range of the receiver of the UE.

303: The RNC delivers a measurement control message to the UE.

In this embodiment, the MC message may contain at least one type of information among the adjacent frequency information, inter-band frequency information, and in-band frequency information of the receiver.

304: The UE stores frequency information for inter-frequency measurement without compressed mode.

305: The UE performs an inter-frequency handover interaction process with the RNC.

The implementation principle of this step is similar to that of step 101 shown in FIG. 1 and will not be described again herein. After implementing this step, the UE is handed over from a frequency used before the handover to a frequency used after the handover.

306: The UE clears the stored frequency information for inter-frequency measurement without compressed mode according to a bandwidth of the receiver and a frequency used after the handover.

In this embodiment, after performing an inter-frequency handover, the UE determines, according to whether the frequency used after the handover matches the bandwidth of the receiver, which manner is used to clear the stored frequency information for inter-frequency measurement without compressed mode. The clearing process may be as follows:

If the frequency after the handover is not adjacent with a related frequency of the stored adjacent frequency information for inter-frequency measurement without compressed mode, the stored adjacent frequency information for inter-frequency measurement without compressed mode is cleared.

If a band combination formed of a band where the frequency after the handover resides and a band where the stored inter-band frequency information for inter-frequency measurement without compressed mode resides is not a band combination supported by the UE, stored inter-band frequency information for inter-frequency measurement without compressed mode is cleared.

If the related frequencies of a frequency used after a handover, frequency information of the configured secondary carrier, and in-band frequency information of the receiver are beyond the bandwidth range of the receiver, stored in-band frequency information of the receiver for inter-frequency measurement without compressed mode is cleared.

307: The RNC delivers a new measurement control message to the UE, where the new measurement control message contains new frequency information for inter-frequency measurement without compressed mode.

In this embodiment, after performing an inter-frequency handover interaction process with network device, a UE may use different methods to clear frequency information for inter-frequency measurement without compressed mode according to whether a frequency used after the handover matches the bandwidth of the receiver. Therefore, after the UE performs the frequency handover, if the network device activates a measurement operation on previously stored frequency information for inter-frequency measurement without compressed mode, the UE performs measurement by using a compressed mode instead of not activating the compressed mode. This avoids a problem of measurement failure of the UE.

In another embodiment, the operation of clearing frequency information for inter-frequency measurement without compressed mode by a UE may be not necessarily performed after the UE performs an inter-frequency handover interaction process with an RNC. For example, in this embodiment, steps 305 and 306 may be replaced with the following operation: When activating adjacent frequency measurement, the UE clears the stored frequency information for inter-frequency measurement without compressed mode if currently used frequency information and the stored frequency information for inter-frequency measurement without compressed mode do not match the bandwidth of the receiver.

Figure 4:
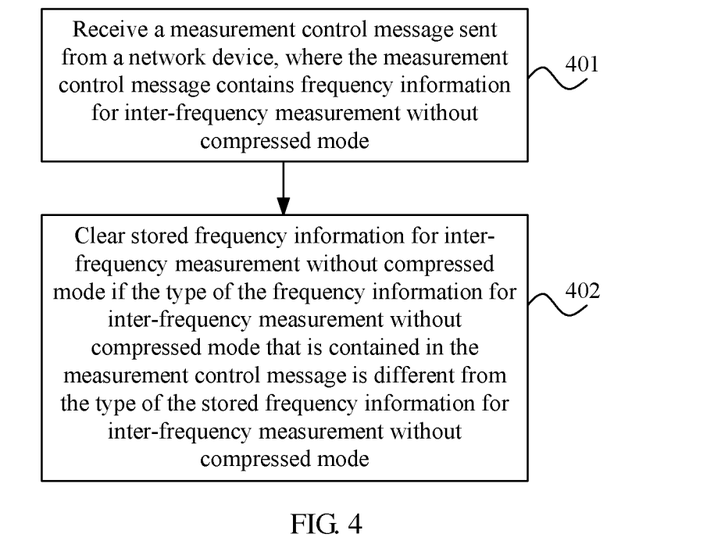
FIG. 4 is a flowchart of a method for processing frequency information according to another embodiment of the present invention.

FIG. 4 is a flowchart of a method for processing frequency information according to another embodiment of the present invention. As shown in FIG. 4, the method of this embodiment may be as follows:

401: Receive a measurement control message from network device, where the measurement control message contains frequency information for inter-frequency measurement without compressed mode.

For example, when the network device needs to configure the frequency information for inter-frequency measurement without compressed mode for a UE, the network device may send an MC message to the UE, where the MC message contains the frequency information for inter-frequency measurement without compressed mode.

The frequency information for inter-frequency measurement without compressed mode may be either adjacent frequency information or inter-band frequency information.

402: Clear stored frequency information for inter-frequency measurement without compressed mode if the type of the frequency information for inter-frequency measurement without compressed mode that is contained in the measurement control message is different from the type of the stored frequency information for inter-frequency measurement without compressed mode.

For example, in the prior art, a UE may simultaneously support both measurement without compressed mode on an adjacent frequency and measurement without compressed mode on an inter-band frequency. However, a UE may measure only one inter-frequency carrier without compressed mode at a time. For example, frequency F2 is initially configured as the adjacent frequency of the UE. Therefore, the UE does not activate the compressed mode when measuring frequency F2. Subsequently, the network device requires the UE to perform measurement without compressed mode on frequency F5 in an inter-band, and therefore the network device configures frequency F5 as an inter-band carrier. However, at this time, the UE still stores frequency F2 as the adjacent frequency. As a result, the UE cannot determine whether to perform frequency measurement without compressed mode on frequency F5 or frequency F2.

In comparison, in this embodiment, after obtaining the frequency information for inter-frequency measurement without compressed mode that is newly configured by the network device, the UE may determine whether the type of the newly configured frequency information for inter-frequency measurement without compressed mode is the same as the type of currently stored frequency information for inter-frequency measurement without compressed mode. If the types of frequency information are different, the UE clears the currently stored frequency information for inter-frequency measurement without compressed mode. The types of the frequency information include the adjacent frequency and the inter-band frequency. For example, the UE stores frequency F2, adjacent frequency information, that is, the UE may perform measurement without compressed mode on frequency F2. If the network device configures measurement without compressed mode on frequency F5 in inter-band frequencies in a new MC process, the UE may determine that frequency information for inter-frequency measurement without compressed mode that is newly configured by a network side is inter-band frequency information. However, the currently stored frequency information for inter-frequency measurement without compressed mode in the UE is adjacent frequency information. The types of the information are different. Therefore, the UE may clear the currently stored frequency F2, the adjacent frequency information. This ensures that in an MC process, the UE only stores one type of frequency information for inter-frequency measurement without compressed mode, thereby avoiding a problem that the UE cannot determine whether to perform the measurement without compressed mode on frequency F5 or frequency F2 when a plurality of types of frequency information for inter-frequency measurement without compressed mode is stored.

It may be understood by persons skilled in the art that, the frequency information for inter-frequency measurement without compressed mode that is contained in the measurement control message in step 401 may be adjacent frequency information for inter-frequency measurement without compressed mode, and correspondingly, the currently stored frequency information for inter-frequency measurement without compressed mode in the UE may be inter-band frequency information; or the frequency information for inter-frequency measurement without compressed mode that is contained in the measurement control message in step 401 may be inter-band frequency information for inter-frequency measurement without compressed mode, and correspondingly, the stored frequency information for inter-frequency measurement without compressed mode in the UE is adjacent frequency information. When performing a clearing process, the UE only needs to clear the currently stored frequency information for inter-frequency measurement without compressed mode.

In this embodiment, during an MC process initiated by network device, if a UE determines that the type of frequency information for inter-frequency measurement without compressed mode that is newly configured by the network device is different from the type of currently stored frequency information for inter-frequency measurement without compressed mode, the UE may clear the currently stored frequency information for inter-frequency measurement without compressed mode. This ensures that in an MC process, the UE only stores one type of frequency information for inter-frequency measurement without compressed mode, thereby avoiding a problem that the UE cannot determine on which frequency the measurement without compressed mode should be performed when a plurality of types of frequency information for inter-frequency measurement without compressed mode is stored.

Figure 5:
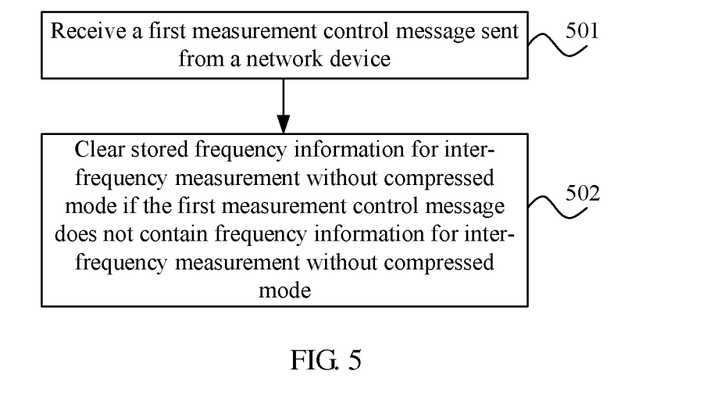
FIG. 5 is a flowchart of a method for processing frequency information according to another embodiment of the present invention.

FIG. 5 is a flowchart of a method for processing frequency information according to another embodiment of the present invention. As shown in FIG. 5, the method of this embodiment may be as follows:

501: Receive a first measurement control message sent from network device.

502: Clear the stored frequency information for inter-frequency measurement without compressed mode if the first measurement control message does not contain frequency information for inter-frequency measurement without compressed mode.

A difference between this embodiment and the embodiments shown in FIG. 1 to FIG. 4 lies in that, in the embodiments shown in FIG. 1 to FIG. 4, a UE independently clears stored frequency information for inter-frequency measurement without compressed mode; in this embodiment, a UE clears stored frequency information for inter-frequency measurement without compressed mode under the control of the network device.

For example, in the prior art, an MC message is used by the network device to configure frequency information for inter-frequency measurement without compressed mode on a UE, and the MC message needs to contain the frequency information for inter-frequency measurement without compressed mode. However, in this embodiment, when the stored frequency information for inter-frequency measurement without compressed mode needs to be cleared in the UE, the network device may send an MC message that does not contain the frequency information for inter-frequency measurement without compressed mode to the UE. Therefore, when the UE receives the MC message and learns that the MC message does not contain the frequency information for inter-frequency measurement without compressed mode, the UE may clear the stored frequency information for inter-frequency measurement without compressed mode.

In this embodiment, by sending an MC message that does not contain frequency information for inter-frequency measurement without compressed mode to a UE, network device may control the UE's operation on clearing stored frequency information for inter-frequency measurement without compressed mode. Therefore, if the network device activates a measurement operation on previously stored frequency information for inter-frequency measurement without compressed mode, the UE performs measurement by using a compressed mode instead of not activating the compressed mode. This avoids a problem of measurement failure of the UE.

Figure 6:
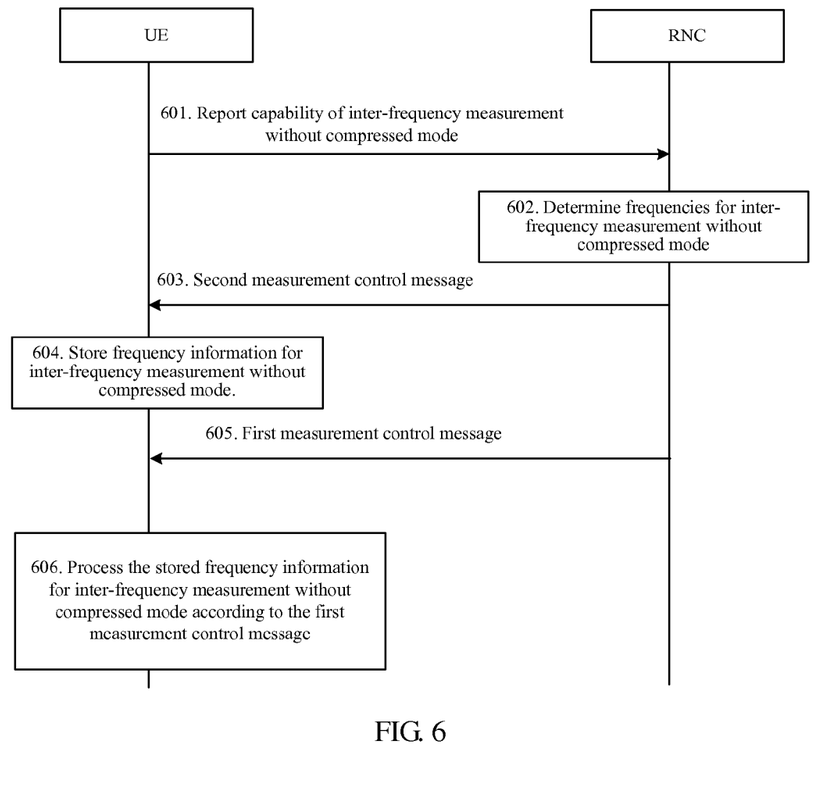
FIG. 6 is a signaling flowchart of a method for processing frequency information according to another embodiment of the present invention.

FIG. 6 is a signaling flowchart of a method for processing frequency information according to another embodiment of the present invention. As shown in FIG. 6, the method of this embodiment may be as follows:

601: A UE reports capability of inter-frequency measurement without compressed mode to an RNC.

The specific implementation process of step 601 is similar to the implementation process of step 201 shown in FIG. 2 and will not be described again herein.

602: The RNC determines frequencies for inter-frequency measurement without compressed mode.

Step 602 is similar to step 202 shown in FIG. 2 or step 302 shown in FIG. 3 and will not be described again herein.

603: The RNC delivers a second measurement control message to the UE.

In this embodiment, the second MC message may contain at least one type of information among adjacent frequency information, inter-band frequency information, and in-band frequency information of a receiver.

In a specific implementation process, the RNC may have an inter-frequency neighboring cell list and an adjacent frequency index for inter-frequency measurement without compressed mode in the inter-frequency neighboring cell list contained in the second MC message, where the inter-frequency neighboring cell list and the adjacent frequency index for inter-frequency measurement without compressed mode in the inter-frequency neighboring cell list may together indicate frequency information for inter-frequency measurement without compressed mode; or the RNC may have first frequency information contained in the second MC message, where the first frequency information may directly indicate the frequency information for inter-frequency measurement without compressed mode.

604: The UE stores frequency information for inter-frequency measurement without compressed mode.

Correspondingly, the stored frequency information for inter-frequency measurement without compressed mode in the UE may be in the following two forms: the first frequency information, or the inter-frequency neighboring cell list and the adjacent frequency index for inter-frequency measurement without compressed mode in the inter-frequency neighboring cell list.

605: The RNC delivers a first measurement control message to the UE.

606: The UE processes the stored frequency information for inter-frequency measurement without compressed mode according to the first measurement control message.

The first MC message indicates an MC process newly initiated by the RNC.

If the first MC message does not contain frequency information for inter-frequency measurement without compressed mode, the UE may clear the stored frequency information for inter-frequency measurement without compressed mode.

If the first MC message contains the frequency information for inter-frequency measurement without compressed mode, operations in the following situations may be performed:

(1) When the stored frequency information in the UE in step 604 is the inter-frequency neighboring cell list and the adjacent frequency index for inter-frequency measurement without compressed mode in the inter-frequency neighboring cell list:

If the first MC message sent from the RNC to the UE contains the adjacent frequency index and does not contain a newly created inter-frequency neighboring cell list, the UE may reserve currently stored frequency information for inter-frequency measurement without compressed mode, that is, in this situation, the UE performs no processing on the currently stored frequency information for inter-frequency measurement without compressed mode.

If the first MC message sent from the RNC to the UE contains both the adjacent frequency index and the newly created inter-frequency neighboring cell list, the UE may perform update processing on the stored frequency information for inter-frequency measurement without compressed mode according to the adjacent frequency index and the newly created inter-frequency neighboring cell list that is contained in the first MC message.

(2) When the stored frequency information in the UE in step 604 is the first frequency information indicated by the network device:

If the first MC message contains second frequency information and the second frequency information is the same as the first frequency information or the first MC message contains fields indicating the continuous use of the first frequency information, the UE may reserve the stored frequency information for inter-frequency measurement without compressed mode, that is, reserves the first frequency information unchanged.

If the first MC message contains the second frequency information and the second frequency information is different from the first frequency information, the UE may update the stored frequency information for inter-frequency measurement without compressed mode to the second frequency information, that is, updates the first frequency information to the second frequency information, so as to reconfigure the frequency information for inter-frequency measurement without compressed mode.

This embodiment is based on the embodiment shown in FIG. 5. Furthermore, if the first MC message contains the frequency information for inter-frequency measurement without compressed mode, the UE may reserve or perform update processing on the stored frequency information for inter-frequency measurement without compressed mode according to the frequency information for inter-frequency measurement without compressed mode that is contained in the first MC message and previously stored frequency information for inter-frequency measurement without compressed mode. Therefore, if the network device activates a measurement operation on the previously stored frequency information for inter-frequency measurement without compressed mode, the UE may perform measurement in correct measurement mode. This avoids a problem of measurement failure of the UE.

Figure 7:
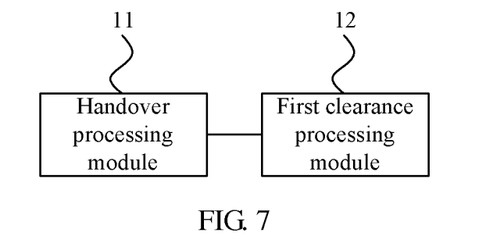
FIG. 7 is a schematic structural diagram of a user equipment according to an embodiment of the present invention.

FIG. 7 is a schematic structural diagram of a user equipment according to an embodiment of the present invention. As shown in FIG. 7, the UE of this embodiment may include: a handover processing module 11 and a first clearance processing module 12. The handover processing module 11 is configured to perform a handover interaction process with network device, and the first clearance processing module 12 is configured to clear stored frequency information for inter-frequency measurement without compressed mode according to a frequency used after the handover processing module 11 performs the handover. For example, the network device may be a radio network controller, such as an RNC, a base station controller, such as a BSC, or a base station, such as an eNodeB, or the like.

The UE in this embodiment may be used to implement the method of the method embodiment shown in FIG. 1. The implementation principle and the achieved technical effect are similar and will not be described again herein.

Figure 8:
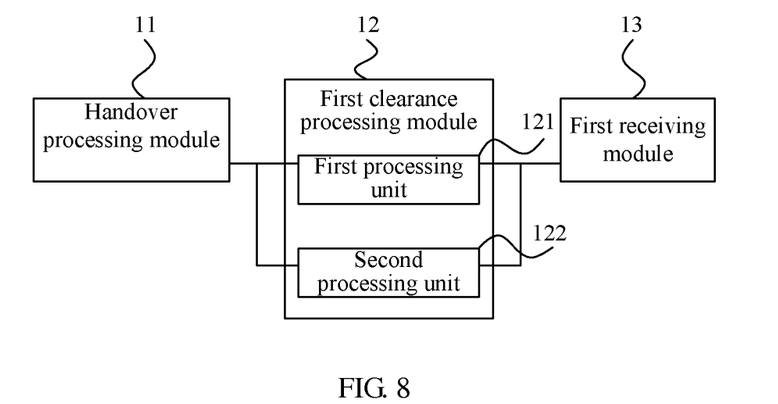
FIG. 8 is a schematic structural diagram of a user equipment according to another embodiment of the present invention.

FIG. 8 is a schematic structural diagram of a user equipment according to another embodiment of the present invention. As shown in FIG. 8, the UE of this embodiment is based on the UE shown in FIG. 7 and may further include: a first receiving module 13, where the first receiving module 13 is configured to receive a measurement control message sent from network device, where the measurement control message contains adjacent frequency information and/or inter-band frequency information for inter-frequency measurement without compressed mode. The first clearance processing module 12 may further include: a first processing unit 121 and a second processing unit 122, where the first processing unit 121 is configured to clear the stored adjacent frequency information; and the second processing unit 122 is configured to clear the inter-band frequency information. For example, the network device may be a radio network controller, such as an RNC, a base station controller, such as a BSC, or a base station, such as an eNodeB, or the like.

The UE in this embodiment may be used to implement the method of the method embodiment shown in FIG. 2. The implementation principle and the achieved technical effect are similar and will not be described again herein.

Figure 9:
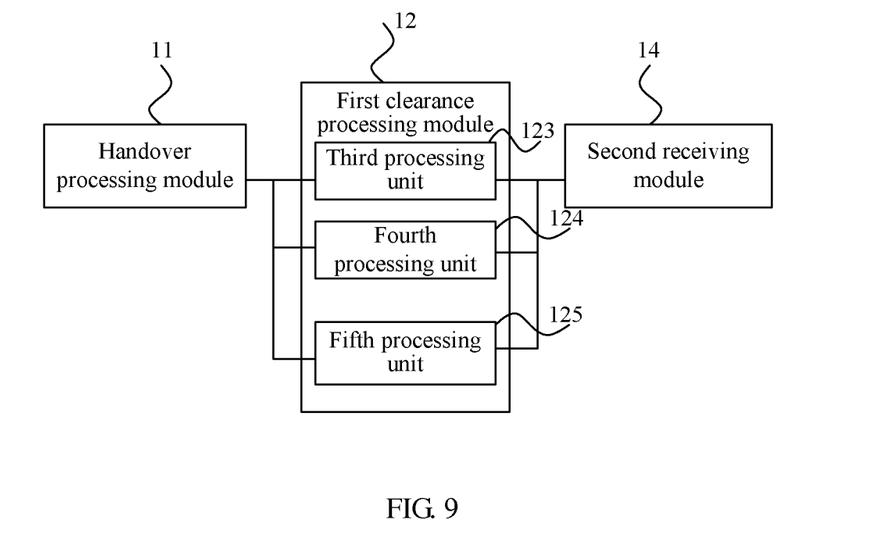
FIG. 9 is a schematic structural diagram of a user equipment according to another embodiment of the present invention.

FIG. 9 is a schematic structural diagram of a user equipment according to another embodiment of the present invention. As shown in FIG. 9, the UE of this embodiment is based on the UE shown in FIG. 7 and may further include: a second receiving module 14, where the second receiving module 14 is configured to receive a measurement control message sent from network device, where the measurement control message contains at least one type of information among adjacent frequency information, inter-band frequency information, and in-band frequency information of a receiver. The first clearance processing module 12 may further include: a third processing unit 123, a fourth processing unit 124, and a fifth processing unit 125, where the third processing unit 123 is configured to clear the stored adjacent frequency information for inter-frequency measurement without compressed mode if the frequency after a handover is not adjacent with the related frequency of the stored adjacent frequency information for inter-frequency measurement without compressed mode; the fourth processing unit 124 is configured to clear stored inter-band frequency information for inter-frequency measurement without compressed mode if a band where frequency after the handover resides and a band where the stored inter-band frequency information for inter-frequency measurement without compressed mode resides are not a band combination; and the fifth processing unit 125 is configured to clear stored in-band frequency information of the receiver for inter-frequency measurement without compressed mode if the related frequencies of a frequency used after a handover, frequency information of the activated secondary carrier, and in-band frequency information of the receiver are beyond a bandwidth range of the receiver. For example, the network device may be a radio network controller, such as an RNC, a base station controller, such as a BSC, or a base station, such as an eNodeB, or the like.

The UE in this embodiment may be used to implement the method of the method embodiment shown in FIG. 3. The implementation principle and the achieved technical effect are similar and will not be described again herein.

Figure 10:
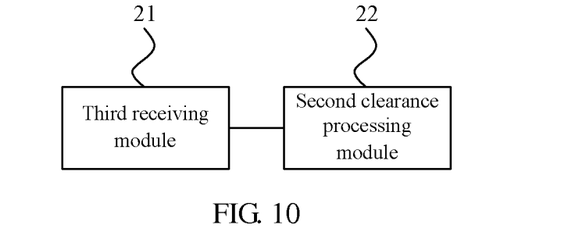
FIG. 10 is a schematic structural diagram of a user equipment according to another embodiment of the present invention.

FIG. 10 is a schematic structural diagram of a user equipment according to another embodiment of the present invention. As shown in FIG. 10, the UE of this embodiment may include: a third receiving module 21 and a second clearance processing module 22, where the third receiving module 21 is configured to receive a measurement control message sent from network device, where the measurement control message contains frequency information for inter-frequency measurement without compressed mode; and the second clearance processing module 22 is configured to clear stored frequency information for inter-frequency measurement without compressed mode if the type of the frequency information for inter-frequency measurement without compressed mode that is contained in the measurement control message received by the third receiving module 21 is different from the type of the stored frequency information for inter-frequency measurement without compressed mode. For example, the network device may be a radio network controller, such as an RNC, a base station controller, such as a BSC, or a base station, such as an eNodeB, or the like.

The UE in this embodiment may be used to implement the method of the method embodiment shown in FIG. 4. The implementation principle and the achieved technical effect are similar and will not be described again herein.

Figure 11:
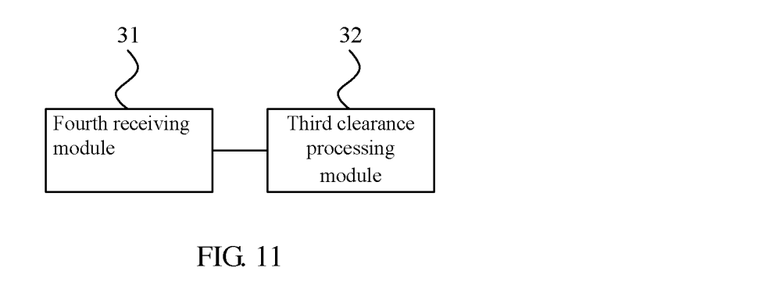
FIG. 11 is a schematic structural diagram of a user equipment according to another embodiment of the present invention.

FIG. 11 is a schematic structural diagram of a user equipment according to another embodiment of the present invention. As shown in FIG. 11, the UE of this embodiment may include: a fourth receiving module 31 and a third clearance processing module 32, where the fourth receiving module 31 is configured to receive a first measurement control message sent from network device; and the third clearance processing module 32 is configured to clear stored frequency information for inter-frequency measurement without compressed mode if the first measurement control message does not contain frequency information for inter-frequency measurement without compressed mode. For example, the network device may be a radio network controller, such as an RNC, a base station controller, such as a BSC, or a base station, such as an eNodeB, or the like.

The UE in this embodiment may be used to implement the method of the method embodiment shown in FIG. 5. The implementation principle and the achieved technical effect are similar and will not be described again herein.

Figure 12:
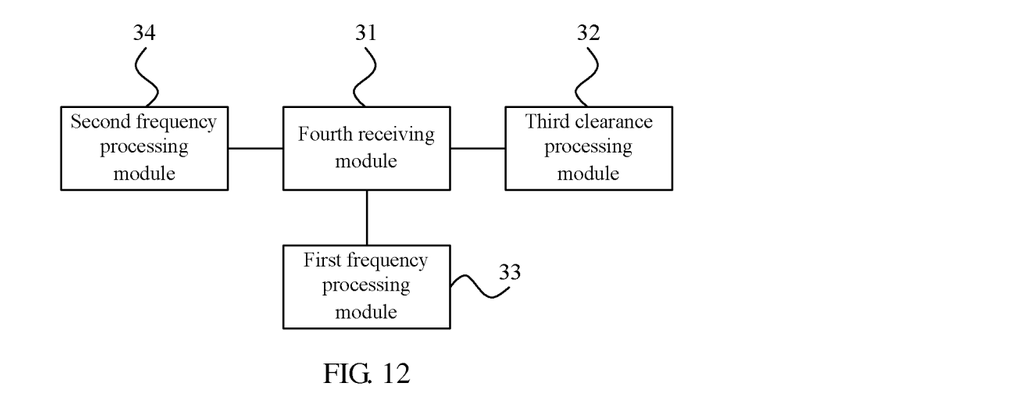
FIG. 12 is a schematic structural diagram of a user equipment according to another embodiment of the present invention.

FIG. 12 is a schematic structural diagram of a user equipment according to another embodiment of the present invention. As shown in FIG. 12, the UE of this embodiment is based on the UE shown in FIG. 11, and furthermore, the fourth receiving module 31 is further configured to receive a second measurement control message sent from the network device, where frequency information in the second measurement control message is an inter-frequency neighboring cell list and an adjacent frequency index for inter-frequency measurement without compressed mode in the inter-frequency neighboring cell list, or is further configured to receive a second measurement control message sent from the network device, where frequency information in the second measurement control message is first frequency information indicated by the network device. The UE may further includes: a first frequency processing module 33 and a second frequency processing module 34, where the first frequency processing module 33 is configured to reserve the stored frequency information for inter-frequency measurement without compressed mode if the first measurement control message contains the adjacent frequency index and does not contain a newly created inter-frequency neighboring cell list, and perform update processing on the stored frequency information for inter-frequency measurement without compressed mode according to the adjacent frequency index and the newly created inter-frequency neighboring cell list that are contained in the first measurement control message if the first measurement control message contains the adjacent frequency index and the newly created inter-frequency neighboring cell list; and the second frequency processing module 34 is configured to reserve the stored frequency information for inter-frequency measurement without compressed mode if the first measurement control message contains second frequency information and the second frequency information is the same as the first frequency information or the first measurement control message contains fields indicating the continuous use of the first frequency information, and update the stored frequency information for inter-frequency measurement without compressed mode to the second frequency information if the first measurement control message contains the second frequency information and the second frequency information is different from the first frequency information. For example, the network device may be a radio network controller, such as an RNC, a base station controller, such as a BSC, or a base station, such as an eNodeB, or the like.

The UE in this embodiment may be used to implement the method of the method embodiment shown in FIG. 6. The implementation principle and the achieved technical effect are similar and will not be described again herein.

It may be clearly understood by persons skilled in the art that, for the purpose of convenient and brief description, for a detailed working process of the foregoing system, apparatus and unit, reference may be made to the corresponding process in the method embodiments, and the details will not be described again herein.

In the embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, which may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated units are implemented in the form of a software functional unit and sold or used as an independent product, the integrated units may be stored in a computer-readable storage medium. Based on such understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, network device, or the like) to execute all or a part of steps of the methods described in the embodiments of the present invention. The storage medium includes any medium that can store program codes, such as a USB flash drive, a mobile hard disk drive, a read-only memory (ROM, Read-Only Memory), a random access memory (RAM, Random Access Memory), a magnetic disk, an optical disk, or the like.

The embodiments are only provided for describing the technical solutions of the present invention, but are not intended to limit the present invention. It should be understood by persons skilled in the art that, although the present invention is described in detail with reference to the embodiments, modifications may be made to the technical solutions described in each of the embodiments, or equivalent replacements may be made to some technical features in the technical solutions, as long as such modifications or replacements do not cause the essence of corresponding technical solutions to depart from the scope of the technical solutions in each of the embodiments of the present invention.

What is claimed is:

1. A method for processing frequency information, comprising:
   receiving a first measurement control message sent from a network device; and
   clearing stored frequency information for inter-frequency measurement without compressed mode if the first measurement control message does not contain frequency information for inter-frequency measurement without compressed mode;
   wherein, before the receiving the first measurement control message from the network device, the method further comprises:
   receiving a second measurement control message from the network device, wherein the second measurement control message includes the frequency information for inter-frequency measurement without compressed mode; and
   storing the frequency information for inter-frequency measurement without compressed mode;
   wherein the frequency information in the second measurement control message is an inter-frequency neighboring cell list and an adjacent frequency index for inter-frequency measurement without compressed mode in the inter-frequency neighboring cell list;
   if the first measurement control message includes the adjacent frequency index and does not include a newly created inter-frequency neighboring cell list, the method further comprises:
   reserving the stored frequency information for inter-frequency measurement without compressed mode; and
   if the first measurement control message includes both the adjacent frequency index and the newly created inter-frequency neighboring cell list, the method further comprises:
   updating the stored frequency information for inter-frequency measurement without compressed mode according to the adjacent frequency index and the newly created inter-frequency neighboring cell list that are included in the first measurement control message.

2. The method according to claim 1, wherein the frequency information in the second measurement control message is first frequency information indicated by the network device;
   if the first measurement control message includes second frequency information and the second frequency information is the same as the first frequency information, or if the first measurement control message includes fields indicating the continuous use of the first frequency information, the method further comprises:
   reserving the stored frequency information for inter-frequency measurement without compressed mode; and
   if the first measurement control message includes the second frequency information and the second frequency information is different from the first frequency information, the method further comprises:
   updating the stored frequency information for inter-frequency measurement without compressed mode to the second frequency information.

3. A user equipment, comprising:
   a receiver, configured to receive a first measurement control message sent from a network device;
   wherein the receiver is further configured to receive a second measurement control message from the network device before the reception of the first measurement control message and wherein the second measurement control message includes frequency information for inter-frequency measurement without compressed mode; and
   the user equipment further comprises:
   a memory, configured to store the frequency information for inter-frequency measurement without compressed mode; and
   a processor, configured to clear stored frequency information for inter-frequency measurement without compressed mode if the first measurement control message does not contain frequency information for inter-frequency measurement without compressed mode;
   wherein the frequency information in the second measurement control message is an inter-frequency neighboring cell list and an adjacent frequency index for inter-frequency measurement without compressed mode in the inter-frequency neighboring cell list; and
   the processor is further configured to reserve the stored frequency information for inter-frequency measurement without compressed mode if the first measurement control message includes the adjacent frequency index and does not contain a newly created inter-frequency neighboring cell list; and update the stored frequency information for inter-frequency measurement without compressed mode according to the adjacent frequency index and the newly created inter-frequency neighboring cell list that are included in the first measurement control message if the first measurement control message includes both the adjacent frequency index and the newly created inter-frequency neighboring cell list.

4. The user equipment according to claim 3, wherein the frequency information in the second measurement control message is first frequency information indicated by the network device; and
   the processor is further configured to reserve the stored frequency information for inter-frequency measurement without compressed mode if the first measurement control message includes second frequency information and the second frequency information is the same as the first frequency information, or if the first measurement control message includes fields indicating the continuous use of the first frequency information; and update the stored frequency information for inter-frequency measurement without compressed mode to the second frequency information if the first measurement control message includes the second frequency information and the second frequency information is different from the first frequency information.

* * * * *